United States Patent [19]

Kaihara et al.

[11] Patent Number: 5,502,530
[45] Date of Patent: Mar. 26, 1996

[54] CAMERA USING SINGLE MOTOR TO DRIVE A FLASH ILLUMINATION-ANGLE VARYING MECHANISM AND OTHER CAMERA OPERATIONS

[75] Inventors: Shoji Kaihara; Hidehiko Fukahori, both of Kanagawa, Japan

[73] Assignee: Canon Kabushiki Kaisha, Tokyo, Japan

[21] Appl. No.: 331,820

[22] Filed: Oct. 31, 1994

Related U.S. Application Data

[62] Division of Ser. No. 798,641, Nov. 26, 1991, Pat. No. 5,384,612.

[30] Foreign Application Priority Data

Nov. 29, 1990 [JP] Japan .................................. 2-332682
Nov. 29, 1990 [JP] Japan .................................. 2-332683
Nov. 29, 1990 [JP] Japan .................................. 2-332685

[51] Int. Cl.$^6$ .................................................. G03B 15/05
[52] U.S. Cl. ................... 354/149.1; 354/149.11
[58] Field of Search ........................ 354/149.1, 149.11, 354/152, 153

[56] References Cited

U.S. PATENT DOCUMENTS

| | | | |
|---|---|---|---|
| 4,970,539 | 11/1990 | Sasagaki et al. | 354/149.1 |
| 4,982,210 | 1/1991 | Shimada et al. | 354/149.1 |
| 5,012,269 | 4/1991 | Tosaka et al. | 354/149.11 X |
| 5,055,866 | 10/1991 | Takebayashi | 354/149.1 |
| 5,070,349 | 12/1991 | Haraguchi et al. | 354/152 |
| 5,079,574 | 1/1992 | Ueno | 354/149.11 |

FOREIGN PATENT DOCUMENTS

| | | |
|---|---|---|
| 62-121428 | 6/1987 | Japan . |
| 1-157328 | 6/1989 | Japan . |
| 1-164933 | 6/1989 | Japan . |

*Primary Examiner*—Michael L. Gellner
*Assistant Examiner*—J. K. Han
*Attorney, Agent, or Firm*—Fitzpatrick, Cella, Harper & Scinto

[57] ABSTRACT

A camera including a flash unit comprising an illumination-angle varying mechanism for varying a flash illumination angle. The camera includes a motor, disposed in a camera body, rotatable in a first direction and in a second direction. A clutch switches a direction of drive transmission in accordance with a switching of a direction of rotation of the motor. A first transmission system transmits a rotation of the motor to the illumination-angle varying mechanism in accordance with a switching of the clutch caused by a rotation of the motor in the first direction. A second transmission system transmits a rotation of said motor to a camera-operating mechanism other than a flash unit operating mechanism in accordance with a switching of the clutch caused by a rotation of the motor in the second direction.

6 Claims, 8 Drawing Sheets

5,502,530

CAMERA USING SINGLE MOTOR TO DRIVE A FLASH ILLUMINATION-ANGLE VARYING MECHANISM AND OTHER CAMERA OPERATIONS

This application is a division of application Ser. No. 07/798,641 filed Nov. 26, 1991, now U.S. Pat. No. 5,384,612.

BACKGROUND OF THE INVENTION

1. Field of the Invention

The present invention relates to a camera which includes a built-in flash unit, or a removably attachable, flash unit, capable of moving between a projected position and a retracted position and having a variable illumination angle.

2. Description of the Related Art

Various automatic pop-up flash mechanisms have conventionally been proposed.

For example, in the system disclosed in Japanese Laid-Open Patent Application No. Sho 62-121428, a flash unit is retained by engagement in the state of being urged in a pop-up direction, and for a pop-up operation, the flash unit is released from the retention by engagement by means of an electromagnet.

Such a conventional example, however, has a number of disadvantages. For example, since a dedicated actuator is needed such as the electromagnet for initiating the pop-up operation of the flash unit, an increase in cost cannot be avoided and the mechanism cannot be simplified. Also, if a flash zooming mechanism is to be added, an additional motor or the like is needed and the size of a camera increases.

Another problem of the conventional example is that when the flash unit is popped up by a spring force, it results in a large bounding impact occurring at the time of the completion of the pop-up operation.

Japanese Laid-Open Utility Model Application No. Hei 1-157328 proposes that a flash zooming mechanism and a drive motor therefor are incorporated in a flash unit which is turnable or movable, between a retracted position and a projected position.

Such a conventional example still has a number of disadvantages. For example, since the dedicated motor for driving the flash zooming mechanism is disposed in the flash unit, costs increase and the size of the flash unit itself increases. In addition, the flash unit whose weight is increased due to the incorporation of the motor must be moved between the retracted position and the projected position.

SUMMARY OF THE INVENTION

It is, therefore, an object of the present invention to provide a camera of reduced cost and size in which the starting of movement of a flash unit from a retracted position to a projected position and an illumination-angle varying operation are carried out by means of the rotation of one motor in one direction.

Another object of the present invention is to provide a camera in which while a flash unit, released from retention by engagement, is being made to move from a retracted position to a projected position by a spring force, the force of a spring used in an engagement mechanism is utilized to apply a braking force to the flash unit, thereby mitigating an impact occurring when the flash unit reaches the projected position and also preventing the flash unit from bounding at that position.

Another object of the present invention is to provide a camera in which an illumination-angle varying mechanism in a flash unit is driven by using a motor provided for driving an operating mechanism in a camera body and in which mechanisms to be driven are switched from one to another by switching the direction of rotation of the motor, whereby the size, costs and weight of the camera can be reduced.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of the present invention will be described below with reference to FIGS. 1 to 8.

First, the arrangement of a mechanism according to the present embodiment will be described with reference to FIGS. 1 and 2, and the details and operation of the arrangement will also be described with reference to FIGS. 3(A), 3(B) and 6(A), 6(B). Then, the operation sequence of the arrangement will be described with reference to FIGS. 7 and 8.

Figure 1:
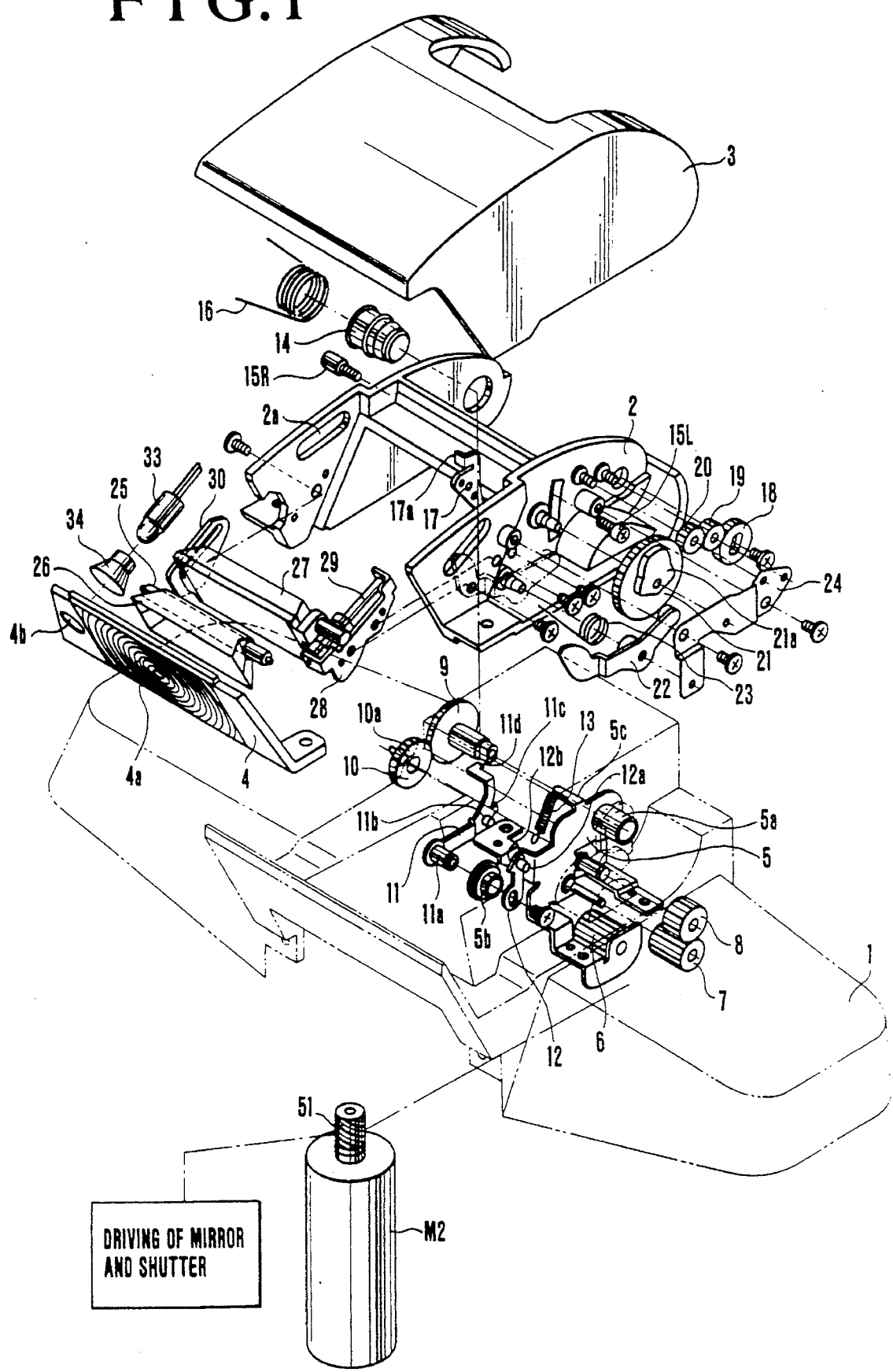
FIG. 1 is an exploded, perspective view diagrammatically showing the construction of a camera according to an embodiment of the present invention.
Figure 2:
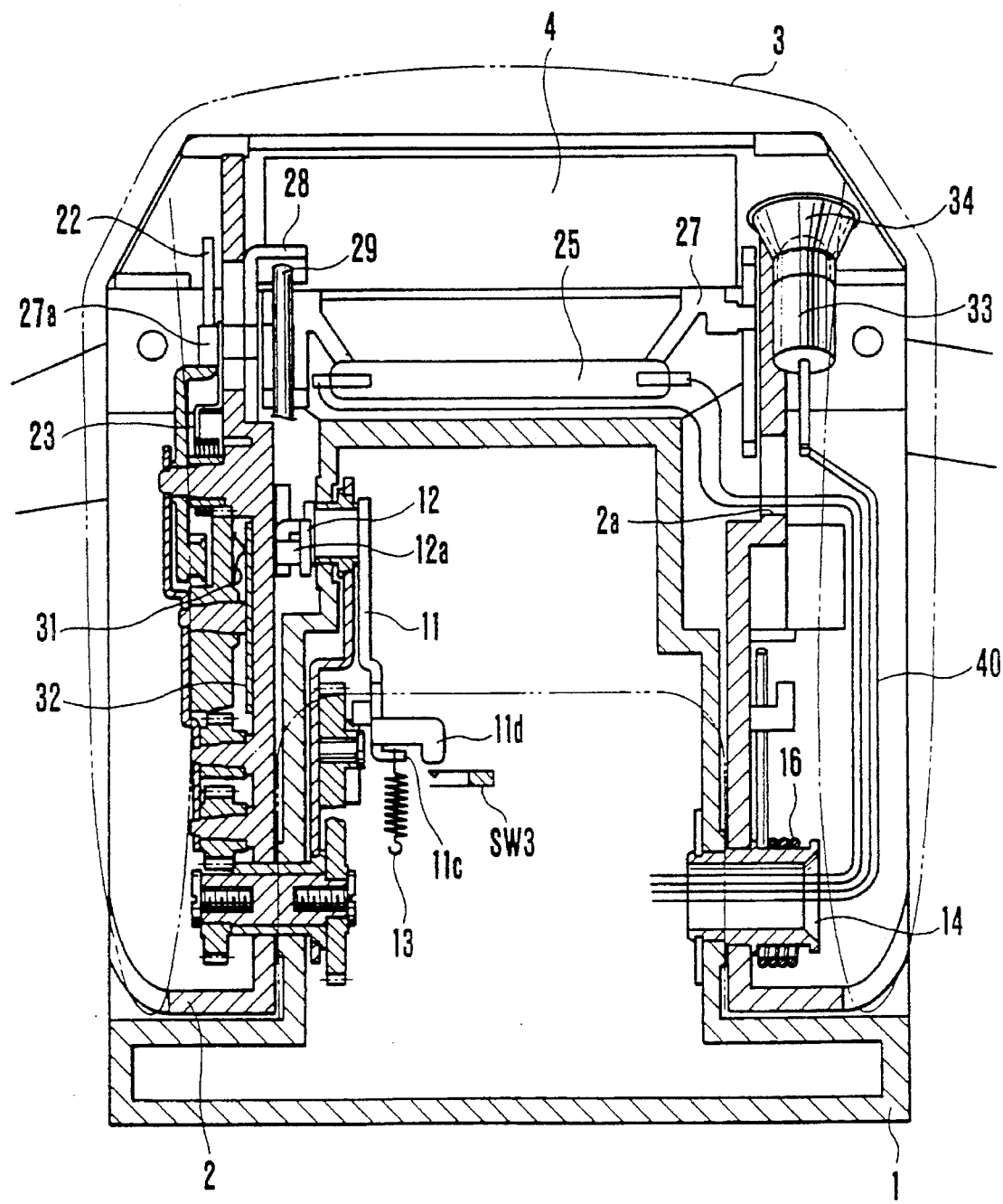
FIG. 2 is a cross-sectional view of FIG. 1.

Referring to FIG. 1, a top cover 1 serves as an exterior member which constitutes part of a camera body. A case 2 is supported rotatably with respect to the top cover 1, and constitutes the skeleton of a flash unit. A slot 2a plays the role of routing a lead wire 40 to be described later by allowing it to pass therethrough, and of absorbing the movement of members caused by a flash zooming operation. A flash cover 3 constitutes the external appearance of the flash unit, and is fixed to the case 2. A panel 4 covers the entire front face of the flash unit, and has a Fresnel lens portion 4a for controlling flash light and a window portion 4b opposing a red-eye preventing lamp which will be described later. A base plate 5 has a plurality of gear shafts, a bearing 5a having an outer circumference which serves as a rotating shaft for the case 2, a bearing 5b and a spring hook 5c. The base plate 5 is fixed to the top cover 1 on the reverse side thereof by screws.

A motor M2 is fixed to the camera body or to a mirror box, and a gear 6 is meshed with a gear train which is coupled to the motor M2 and which includes a planetary clutch mechanism to be described later. Rotation in one direction only is transmitted to the gear 6 from the motor M2 through the gear train. The rotation of the gear 6 is rotationally transmitted to a gear 8 through a gear 7.

A gear 9 is meshed with the gear 8, and is rotatably fitted into the inner circumference of the bearing 5a of the base plate 5. A gear 10 is meshed with the gear 9, and has a blade assembly 10a on one face. A lever 11 has a shaft portion 11a, a projection 11b, a spring hook 11c and a switch pressing portion 11d, and the shaft portion 11a is supported for rotation with respect to the inner circumference of the bearing 5b. The switch pressing portion 11d turns on a switch SW3 when the lever 11 moves for a pop-up operation. A retaining lever 12 has a claw 12b as well as a projection 12a in the vicinity of the claw 12b, and is fixed to the shaft portion 11a of the lever 11. A spring 13 is hooked on the spring hook 5c of the base plate 5 at one end and on the spring hook 11c of the lever 11 at the other end. The spring 13 urges the retaining lever 12 counterclockwise, i.e., so that the claw 12b rotates in its engagement direction. A bearing 14 is, in part, fixed to the top cover 1 and, in part, serves as a rotating shaft for the case 2.

Screws 15L and 15R serve as stoppers when the case 2 rotates in the direction in which it projects from the top cover 1, and are fastened to the top cover 1. A spring 16 urges the case 2 in the pop-up direction, and is fitted onto a portion of the outer circumference of the bearing 14 with one arm hooked on the screw 15R and the other arm on the case 2. A fixed engagement member 17 has a hook 17a on which the claw 12b of the retaining lever 12 is hooked. As shown in more detail in FIGS. 6(A) and 6(B), the fixed engagement member 17 has cam portions 17b and 17c, and the cam portion 17c has an arc concentric to the rotational axis of the case 2. The fixed engagement member 17 is fixed to the case 2.

Figure 5A:
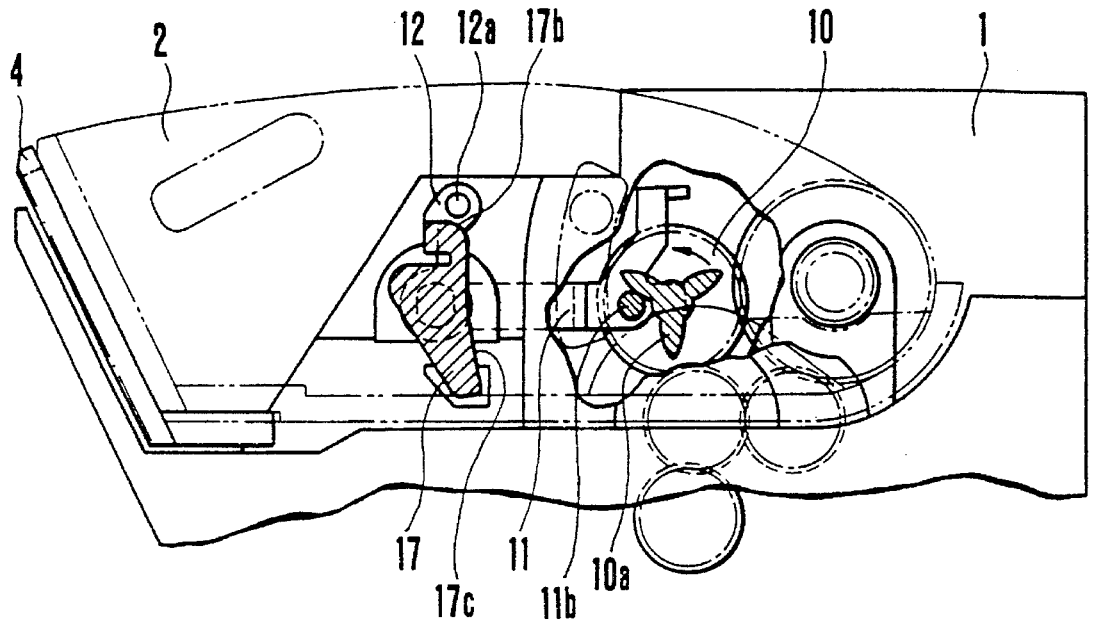
FIGS. 5(A), 5(B) and 5(C) are schematic views illustrating the automatic pop-up operation of the flash unit.
Figure 5B:
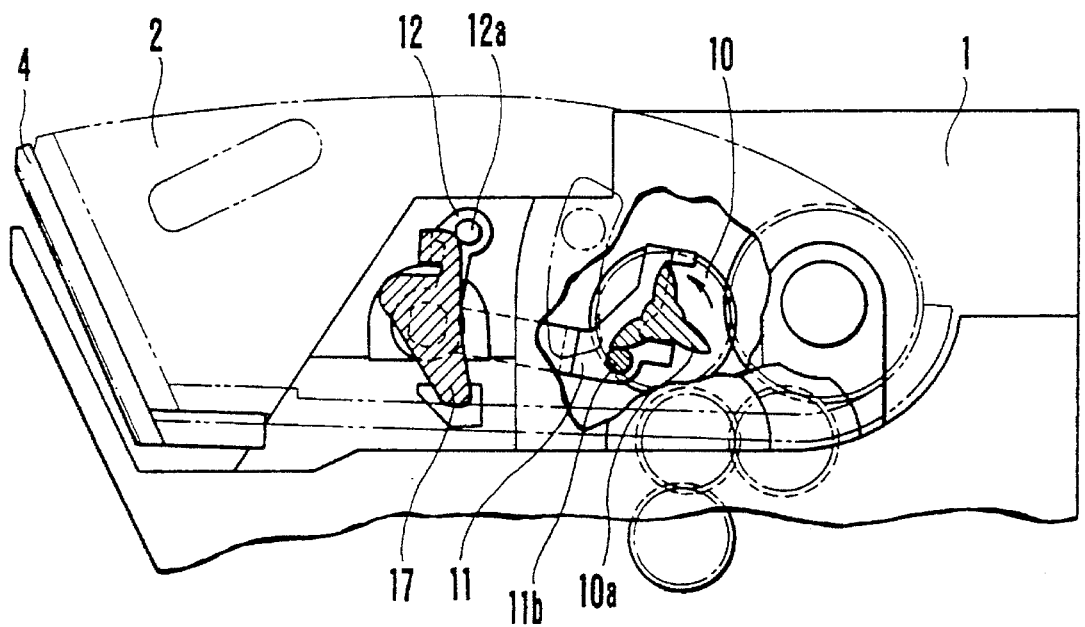
Figure 5C:
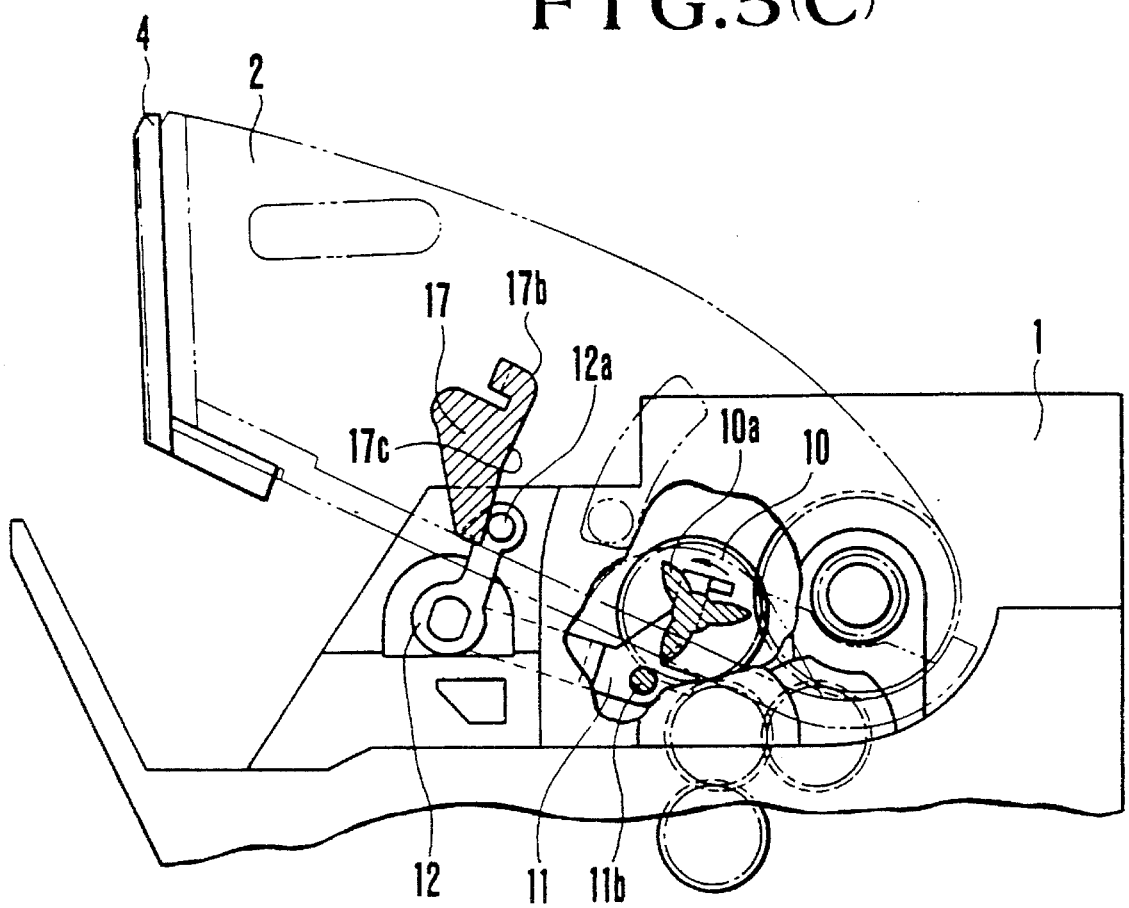
Figure 6A:
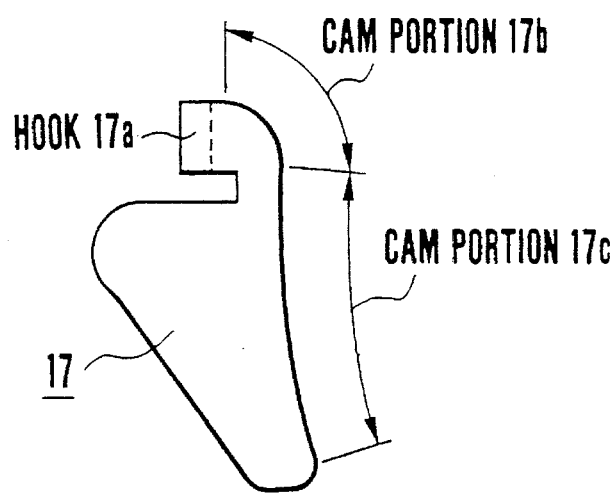
FIGS. 6(A) and 6(B) are views of the shapes of cam portions of the fixed engagement member shown in FIGS. 5(A), 5(B) and 5(C)
Figure 6B:
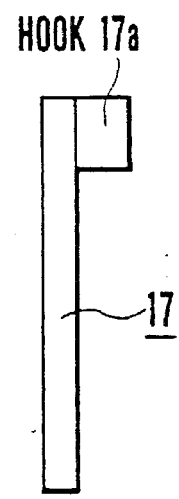

As shown in FIGS. 5(A) to 5(C), when the motor M2 is activated, the rotation of the motor M2 is transmitted to the gear 10 through the gears 6 to 9 and the blade assembly 10a of the gear 10 presses down the projection 11b of the lever 11 against the spring 13. Then, the retaining lever 12 is made to rotate in a clockwise direction which is the same as the direction of movement of the lever 11, and the claw 12b of the retaining lever 12 is released from the hook 17a of the fixed engagement member 17. The case 2 starts to turn in the projecting direction by the urging of the spring 16, thus bringing the projection 12a into abutment with the cam portion 17b of the fixed engagement member 17.

The case 2 turns further, and as it turns by the force of the spring 16, the case 2 presses the projection 12a of the retaining lever 12 through the cam portions 17b to 17c of the fixed retaining member 17. Thus, the retaining lever 12 is made to turn in the region of the cam portion 17c until the projection 11b of the lever 11 moves away from the rotating area of the blade assembly 10a of the gear 10 (refer to FIGS. 5(B) and 5(C)). In other words, the retaining lever 12 is released by the blade assembly 10a and the case 2 starts its upward movement. The retaining lever 12 is made to escape to a further extent by the upward movement of the case 2, and the projection 11b of the lever 11 is made to turn outward of the rotating area of the blade assembly 10a so that no further rotation of the motor M2 is transmitted to either of the lever 11 and the retaining lever 12. The case 2 further turns in the projecting direction until it comes into abutment with the screws 15L and 15R, with a constant frictional force produced between the projection 12a and the arcuate part of the cam portion 17c by the urging force of the spring 13 (refer to FIGS. 5(A) to 5(C)).

A gear 18 is fixed coaxially to the gear 9 positioned within the top cover 1 and transmits a drive force to a mechanism inside of the case 2. Idlers 19 and 20 transmit the rotation of the gear 18 to a gear 21. The gear 21 has a cam 21a on one face and a contact piece 31 (refer to FIG. 2) fixed to the other face. The contact piece 31 is in slidable contact with a printed board 32 (refer to FIG. 2) to detect the phase of the cam 21a. The aforesaid gears 19 to 21 are supported for rotation about associated shafts on the case 2. A transmission lever 22 has a bearing which is rotatably fitted onto an associated shaft on the case 2, a roller 22a for tracing the motion of the cam 21a, and a pressure part, or pushing portion 22b, for pressing a holder 27 (refer to FIG. 3(A)). A spring 23 is fitted onto the outer circumference of the bearing of the transmission lever 22 with one end hooked on the case 2 and the other end, on the holder 27 which will be described later. A pressure plate 24 is fastened to the case 2 by screws in the state of securing the gears 19 to 21 and the transmission lever 22 in position.

Figure 3A:
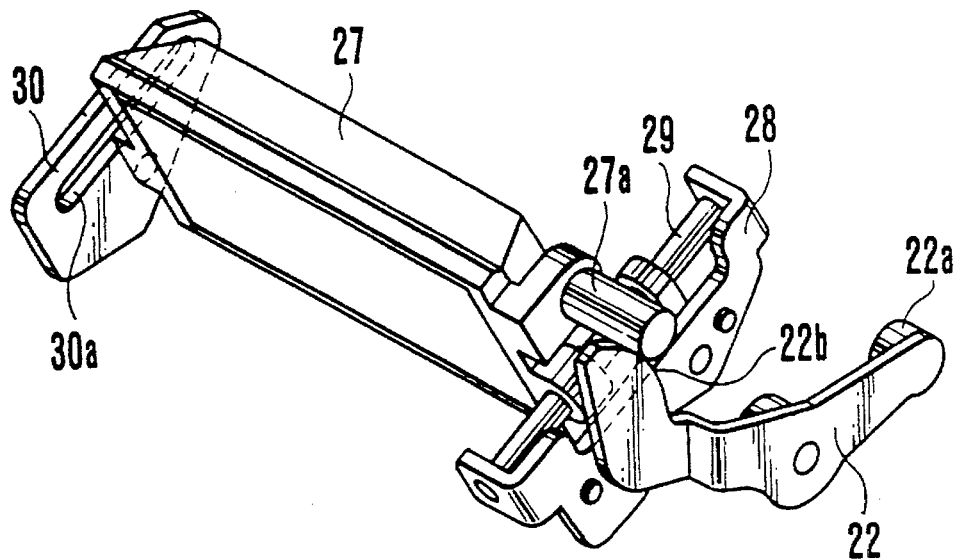
FIGS. 3(A) and 3(B) are diagrammatic perspective views showing the manner in which a holder in FIG. 1 is held.
Figure 3B:
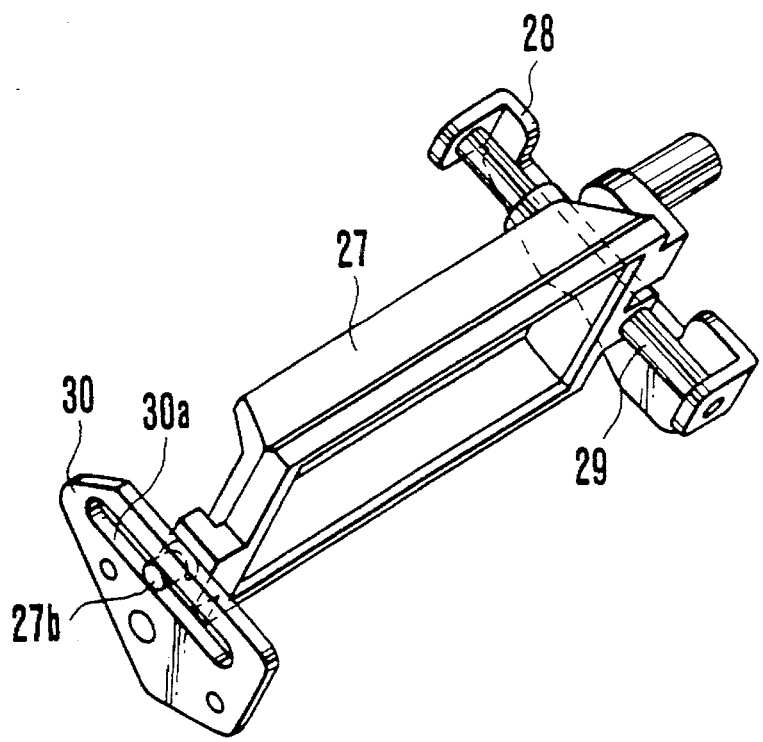

A xenon tube 25 is fixed to a reflector 26 by rubber which is not shown. The holder 27 holds the xenon tube 25 and the reflector 26. A holding member 28 is fixed in the inside of the case 2. A shaft 29 is held by the holding member 28 and is positioned to extend in a direction perpendicular to the plane of the panel 4. A rail member 30 has a rail-like slot 30a which extends in the same plane as the shaft 29, and is fixed in the inside of the case 2. As shown in FIGS. 3(A) and 3(B), one end of the holder 27 is supported for sliding movement along the axis of the shaft 29, and the other end has a boss 27b which is supported for sliding movement along the slot 30a in the rail member 30. One end of the spring 23 is hooked on a projection 27a of the holder 27, and the holder 27 is urged toward the panel 4 by the spring 23 and is subjected to a restricting force acting in an opposite direction by the transmission lever 22.

Figure 4:
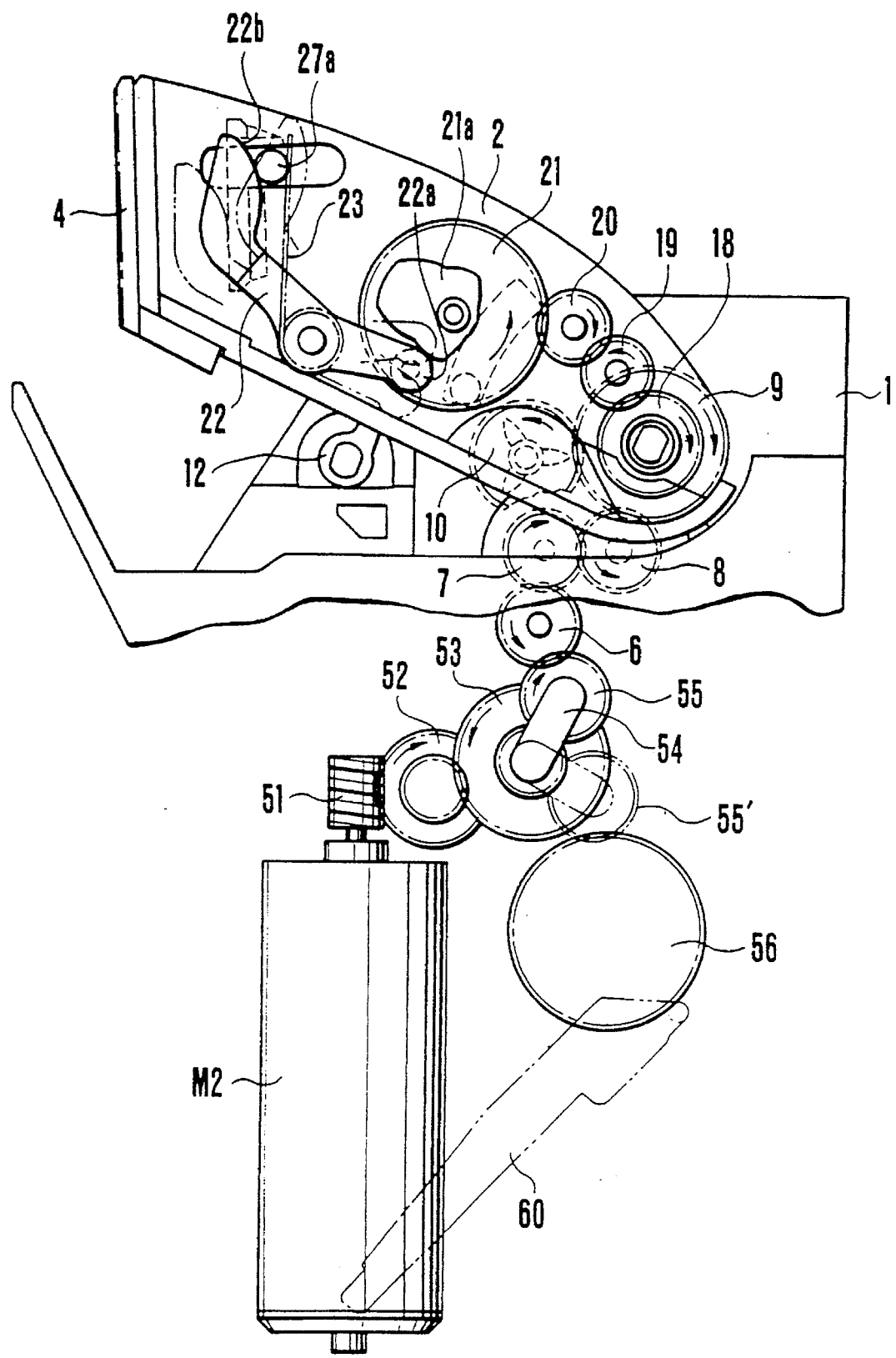
FIG. 4 is a schematic view illustrating the operation of a zooming mechanism for a flash unit.

More specifically, as shown in FIG. 4, the transmission lever 22 is made to swing on the basis of the cam displacement of the cam 21a of the gear 21 to which the rotation of the motor M2 is transmitted. A pushing portion 22b pushes the projection 27a of the holder 27 against the spring 23, thereby causing a flash part made up of the reflector 26 and the xenon tube 25 held by the holder 27 to move to and fro in opposite directions perpendicular to the plane of the panel 4.

A red-eye preventing lamp 33 and a reflector 34 for intensifying the light from the red-eye preventing lamp 33 by reflection are fixed on the reverse side of the window 4b of the panel 4. As shown in FIG. 2, the case 2 is divided into three sections: the flash part made up of the members 25 to 27 is laid out in the middle section; a mechanism part including the elements 18 to 24 for driving the flash part, in the left-hand side section; and a unit made up of the red-eye preventing lamp 33 and the reflector 34, in the right-hand side section. A bundle of lead wires 40 extends through the bearing 14 into the right-hand side section of the case 2, and some of the lead wires 40 are connected to the lamp 33 with the other lead wires connected to the xenon tube 11 through the slot 2a.

A planetary clutch mechanism for transmission of the output of the motor M2 will be described below with reference to FIG. 4. An output gear 51 of the motor M2 is coupled to a sun gear 53 through a transmission gear 52. A planetary lever 54 is frictionally coupled to the central shaft of the planetary gear 53, and a planetary gear 55 is rotatably supported by the planetary lever 54. Thus, the sun gear 53, the planetary lever 54 and the planetary gear 55 constitute the planetary clutch mechanism.

Although a detailed illustration is omitted, a mirror driving gear 56 is provided. As the mirror driving gear 56 rotates in one direction, a main mirror 60 performs the motion of moving from the observation-enable position (down position) shown in FIG. 4 to an exposure-enable withdrawal position (up position) and returning from the exposure-enable withdrawal position to the observation-enable position.

When the motor M2 is reversed, the sun gear 53 rotates in the counterclockwise direction to mesh the planetary gear 55 with the gear 6. When the motor M2 is forwarded, the planetary gear 55 meshes with the mirror driving gear 56.

Figure 7:
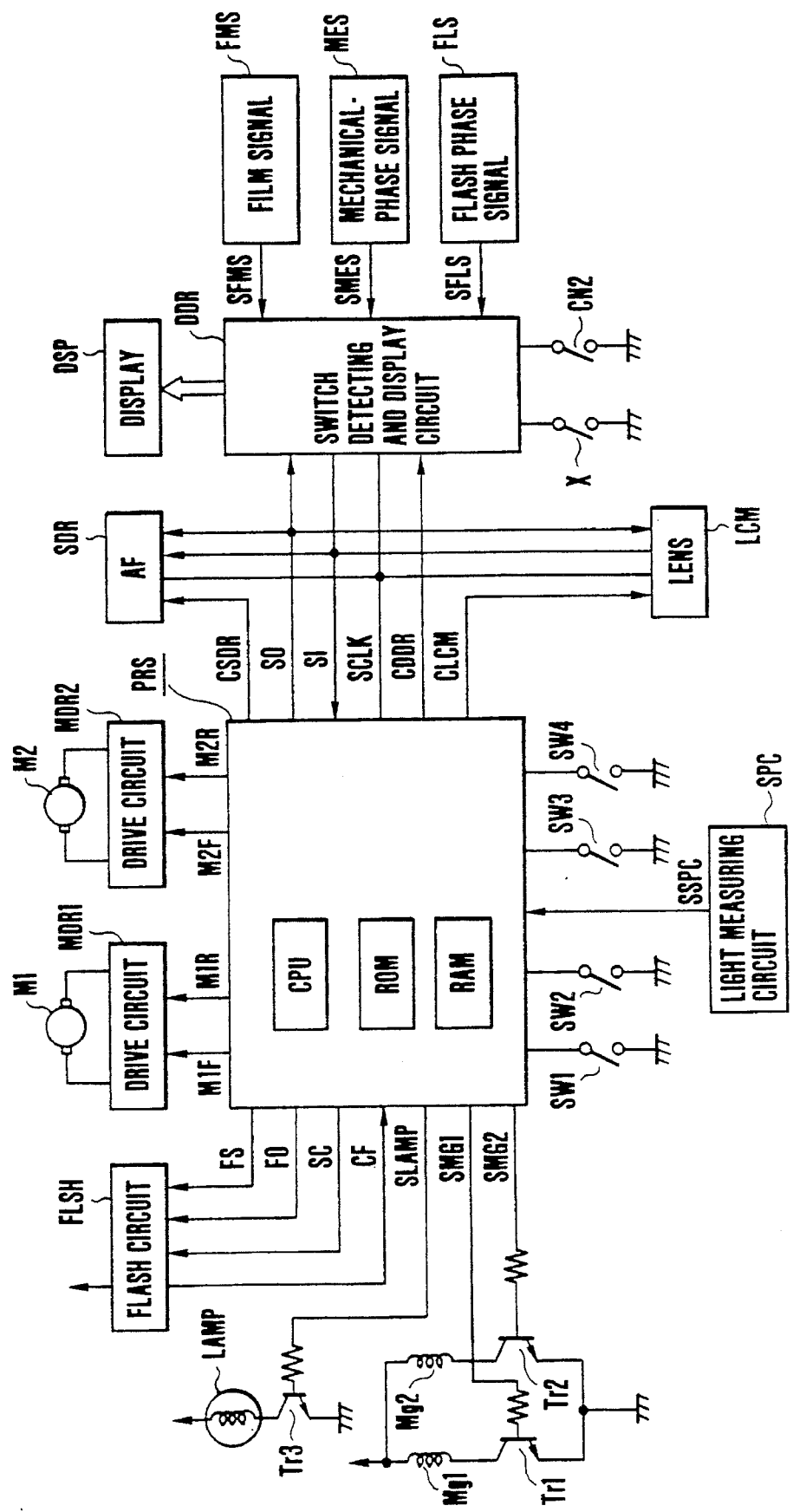
FIG. 7 is a block diagram showing the circuit of the embodiment.

FIG. 7 is a circuit block diagram showing the present embodiment.

A circuit element PRS performs camera control and consists of a one-chip microcomputer (hereinafter referred to as a "microcomputer") including, for example, a CPU (central processing unit), a ROM and a RAM as well as an A/D conversion function. The microcomputer PRS controls a series of operations of the camera such as an automatic exposure control function, an automatic focus detecting function, a flash control function, a film winding function and a mechanism charging function in accordance with a sequence program for the camera which is stored in the ROM.

To achieve the aforesaid control, the microcomputer PRS communicates with a lens and peripheral circuits provided in the camera body by using synchronous communication signals SO, SI and SCLK as well as communication selecting signals CLCM, CSDR and CDDR, thereby controlling individual circuits and the operation of the lens.

Symbol SO represents a data signal outputted from the microcomputer PRS, symbol SI represents a data signal inputted to the microcomputer PRS, and symbol SCLK represents a sync clock for the signals SO and SI. A lens communication buffer circuit LCM supplies electrical power to a power source terminal for the lens during the operation of the camera, and serves as a buffer for communication between the camera and the lens when the selecting signal CLCM from the microcomputer PRS is at its high potential level (hereinafter referred to simply as "H level"). More specifically, when the microcomputer PRS sets the selecting signal CLCM to an H level and sends out predetermined data as the signal SO in synchronism with the sync clock SCLK, the buffer circuit LCM outputs buffer signals such as the sync clock SCLK and the signal SO to the lens through camera-to-lens contacts. Similarly, the buffer circuit LCM outputs as the signal SI a signal indicative of a focal length supplied from the lens. The microcomputer PRS receives the signal SI as data from the lens in synchronism with the sync clock SCLK.

A circuit SDR is a drive circuit for a focus-detecting line sensor made up of a CCD and other sensors. When the communication selecting signal CSDR is at its H level, the drive circuit SDR is selected and is controlled by the microcomputer PRS by using the signals SO, SI and the clock SCLK.

A light-measuring sensor SPC for exposure control receives light from a subject through a photographic lens. An output SSPC of the light-measuring sensor SPC is applied to an analog input terminal of the microcomputer PRS and, after A/D conversion, is used for automatic exposure control (AE) in accordance with a predetermined program.

A circuit DDR is a circuit for performing switch detection and for providing display, and when the signal CDDR is at its H level, the circuit DDR is selected and is controlled by the microcomputer PRS by using the signals SO, SI and the sync clock SCLK. A circuit FMS is a film-transportation detecting circuit and its detection output is inputted into the circuit DDR as a signal SFMS. A circuit MES is a mechanical-phase detecting circuit for a shutter, a mirror and the like, and its detection output is inputted into the circuit DDR as a signal SMES.

A circuit FLS is a flash-phase detecting circuit, and detects whether the flash unit has popped up or determines the phase of the zooming of the flash unit, and supplies a detection output to the circuit DDR as a signal SFLS. A switch X is turned on when the running of the leading curtain of the shutter is completed, and a switch CN2 is turned on when the running of the trailing curtain is completed.

The circuit DDR switches the display contents of a display member DSP of the camera or transmits switch or state signals associated with various states of the camera to the microcomputer PRS by communication, on the basis of data transmitted from the microcomputer PRS.

Switches SW1 and SW2 are switches interlocked with a release button which is not shown. When the release button is depressed to a first stroke position, the switch SW1 is turned on, and subsequently, when the release button is depressed to a second stroke position, the switch SW2 is turned on. When the switch SW1 is turned on, the microcomputer PRS performs light measurement, automatic focus adjustment, a pop-up operation of the flash unit and red-eye preventing flashing, as will be described later. When the switch SW2 is turned on to generate a trigger signal, the microcomputer PRS performs exposure control, flashing of the flash unit and film winding. A switch SW3 is a switch for detecting the completion of the pop-up operation of the flash unit, and detects the motion of the aforesaid lever 11. A motor M1 is a film transporting motor, and a motor M2 is a motor for realizing mirror-up and mirror-down operations, shutter charging, a pop-up initiating operation of the flash unit and driving for flash zooming (variation of an illumination angle). The motors M1 and M2 are driven in the forward and reverse directions under the control of associated drive circuits MDR1 and MDR2. Signals M1F, M1R, M2F and M2R are inputted from the microcomputer PRS to the drive circuits MDR1 and MDR2 as signals for motor control.

Electromagnets Mg1 and Mg2 are provided for initiating the running of the leading curtain and the trailing curtain of the shutter, respectively. The electromagnets Mg1 and Mg2 are respectively energized by amplifier transistors Tr1 and Tr2 by the application of signals SMG1 and SMG2, whereby the shutter is controlled by the microcomputer PRS.

A lamp LAMP is a red-eye preventing lamp and is energized by an amplifier transistor Tr3 by the application of a signal SLAMP, whereby emission control is provided by the microcomputer PRS.

A circuit FLSH is a flash circuit including a main capacitor and a xenon tube, and is controlled by the microcomputer PRS by means of a flashing signal FS, a flashing stop signal FO, a charging start signal SC and a charging completion signal CF.

A switch SW4 is a switch indicating whether a red-eye preventing mode is set.

Figure 8:
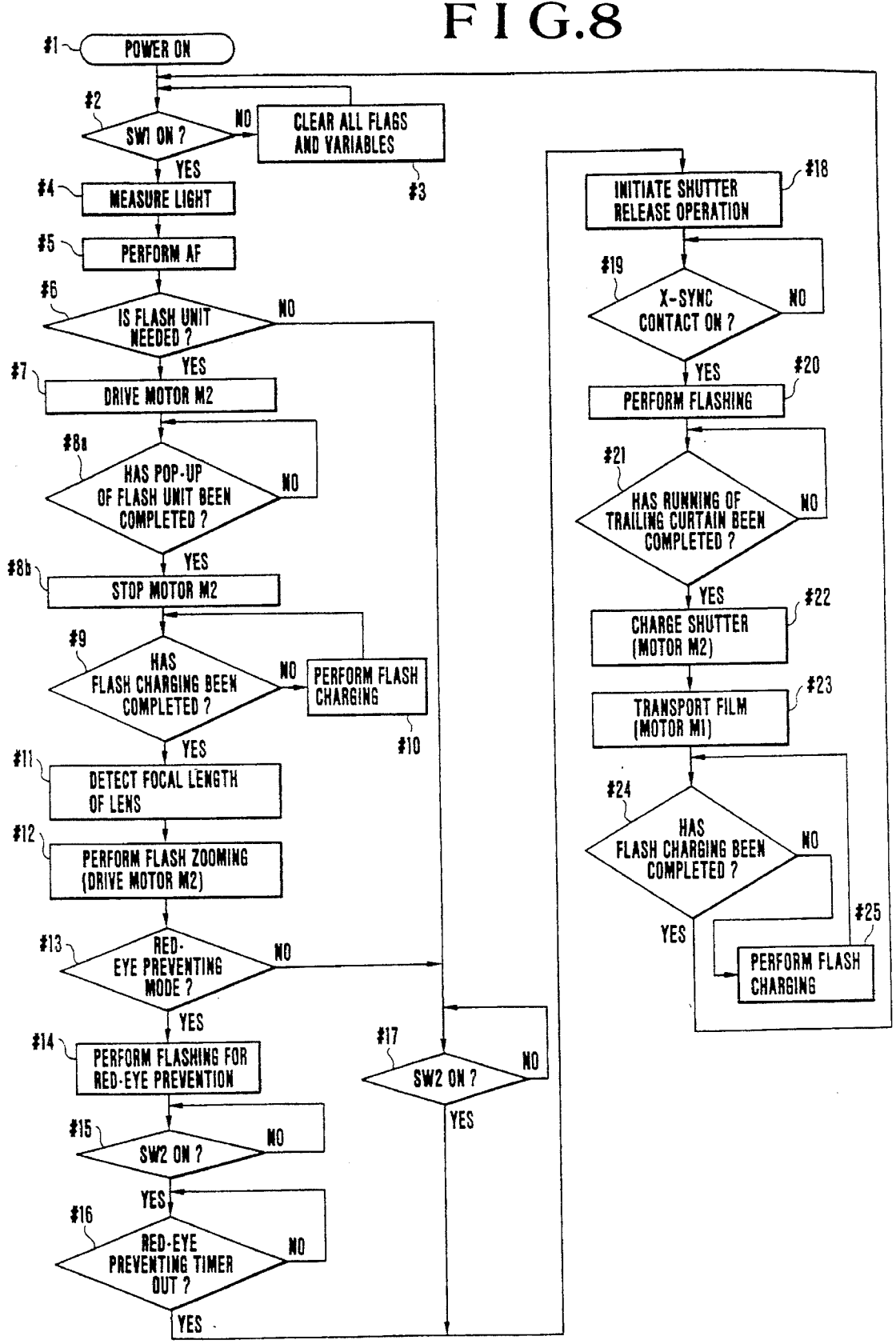
FIG. 8 is a flowchart of the operation of the embodiment.

The operation of the camera having the above-described arrangement will be described below with reference to the flowchart of FIG. 8. When a power source switch (not shown) is turned on (Step #1), the supply of electricity to the microcomputer PRS is initiated and the microcomputer PRS initiates execution of a sequence program stored in the ROM. When the execution of the sequence program is initiated by the aforesaid operation, it is detected in Step #2 whether the switch SW1 has been turned on by the depression of the release button SW1 to the first stroke position. If the switch SW1 is off, the process proceeds to Step #3, where all control flags and control variables set in the RAM of the microcomputer PRS are cleared and initialized.

Steps #2 and #3 are repeated until the switch SW1 is turned on or the power source switch is turned off. When the switch SW1 is turned on, the process proceeds to Step #4. In Step #4, a light measurement subroutine for exposure control is executed. An output SSPC from the light measuring circuit SPC shown in FIG. 7 is inputted into the microcomputer PRS through an analog input terminal thereof, and the microcomputer PRS performs A/D conversion. The microcomputer PRS computes an optimum shutter control value and aperture control value on the basis of the digital light measurement value and determines whether use of the flash unit is needed, and stores the optimum shutter and aperture control values and the decision result into predetermined addresses within the RAM. In Step #5, an AF operation is completed, and if it is determined in Step #6 whether the flash unit is needed, the operation of setting the flash unit to a usable condition is started. Also, during a release operation, control of the shutter and the diaphragm is performed on the basis of the aforesaid values.

In Step #7, the motor M2 is reversed, and the gears 6 to 10 are made to rotate to release the retention provided by the retaining lever 12, thereby causing the flash unit to pop up. Then, the process proceeds to Step #8a, where it is detected whether the flash unit has been popped up by detecting whether the switch SW3 has been turned on. If the completion of the pop-up operation is detected, the motor M2 is temporarily stopped in Step #8b. In Step #9, it is determined whether the charging of the flash unit has been completed. If the flash unit has not yet been completely charged, the process proceeds to Step #10, where the microcomputer PRS outputs the charging-of-flash-unit start signal SC to start the charging of the flash unit. If the charging is completed, the charging completion signal CF is generated, and the process proceeds to Step #11. In Step #11, the microcomputer PRS receives information on the present focal length of the photographic lens via the lens communication buffer circuit LCM. Then, in Step #12, the motor M2 is again reversed. Since the flash unit has previously been popped up by the reverse drive of the motor M2 in Step #7, a retention release mechanism withdraws into a non-engagement position and continues idling. Since the projection 11b of the lever 11 is away from the rotating area of the blade assembly 10a, only a flash zooming mechanism is driven by motor M2 (the transmission lever 22 is made to swing by the motion of the cam 21a, thereby moving the holder 27). A signal from the flash-zooming detecting printed board 32 is transmitted to the microcomputer PRS via the flash-phase detecting circuit FLS. At the time when the flash unit reaches the position of an illumination angle corresponding to the present focal length of the photographic lens, the motor M2 is reversed. Although not shown, the detecting printed board 32 has a pattern corresponding to focal length (cam phase), and the state of zooming of the flash unit is detected by causing the contact piece 31 to slide on the pattern. The process proceeds to Step #13, where the state of the switch SW4 is identified to determine whether the red-eye preventing mode has been set. If it is determined that the red-eye preventing mode has not been set, the process proceeds to Step #17; otherwise, the process proceeds to Step #14.

If the red-eye preventing mode has been set, the lamp LAMP (red-eye preventing lamp 33) is lit up when the signal SLAMP of the microcomputer PRS of FIG. 7 is at the H level, and illuminates a subject to reduce the pupils thereof, thereby preventing a red-eye phenomenon. Then, the process proceeds to Step #15, where it is detected whether the switch SW2 has been turned on by the depression of the release button to the second stroke position. If the switch SW2 is off, the process waits for the switch SW2 to be turned on in Step #15. If the switch SW2 is on, the process proceeds to Step #16. It is determined in Step #16 whether the time period required to reduce the pupils has elapsed. If such required time period has not yet elapsed, the lamp LAMP continues to be lit up. If the required time period elapses, the process proceeds to Step #18. If it is determined in Step #6 that the flashing of the flash unit is not needed, the process proceeds to Step #17, where it is determined whether the switch SW2 has been turned on. If it is determined in Step #13 that the red-eye preventing mode has not been set, the process similarly proceeds to Step #17, where it is determined whether the switch SW2 has been turned on. If the switch SW2 is turned on, the process proceeds to Step #18, where a shutter release operation is started. More specifically, the motor M2 is driven forwarding accordance with the signal M2F from the microcomputer PRS, and meshes the planetary gear 55 with the mirror driving gear 56 to perform a mirror-up operation. When the mirror-up operation is completed, the signal SI is sent to the microcomputer PRS through the mechanical-phase detecting circuit MES and the motor M2 is made to stop. Then, the shutter leading curtain electromagnet Mg1 is energized in accordance with the signal SMG1 from the microcomputer PRS, and the shutter leading curtain is made to run by the force of a spring which is not shown, thereby causing film to be exposed. Subsequently, the signal SMG2 is generated after a predetermined time delay based on the shutter speed computed in Step #4, and the shutter trailing curtain electromagnet Mg2 is energized to cause the shutter trailing curtain to run. If the flash unit is not needed, the shutter speed is set to a flash sync speed. If the flash unit is needed, the process proceeds to Step #19, where a decision is made as to the state of an X-sync contact which is turned on when the shutter leading curtain completes running. If the X-sync contact is turned on, the signal is sent to the microcomputer PRS through the circuit DDR and, in Step #20, the flash unit is made to flash (the xenon tube 25 is made to flash). If the flash unit is not needed, it does not flash. If the flash unit flashes, the flashing stop signal FO is generated on the basis of the output of a flashing control circuit which is not shown, and the flashing of the flash unit is stopped. Then, the process proceeds to Step #21, where it is determined whether the running of the shutter trailing curtain has been completed. If the running of the shutter trailing curtain has been completed, the switch CN2 is turned on and a corresponding signal is transmitted to the microcomputer PRS through the circuit DDR. The process proceeds to Step #22. In Step #22, the motor M2 is driven forward on the basis of the signal M2F to perform a mirror-down operation and a shutter charging operation. If the mirror-down operation and the shutter charging operation have been completed, a corresponding signal is transmitted to the microcomputer PRS through the mechanical-phase detecting circuit MES and the forward rotation of the motor M2 is stopped. Then, the process proceeds to Step

23, where film transportation is performed. The motor M1 is driven forward on the basis of the signal M1F from the microcomputer PRS, thereby causing the film to be wound.

When the film is wound by one frame, a corresponding signal is transmitted to the microcomputer PRS through the film-transportation detecting circuit FMS, and the forward running of the motor M1 is stopped. Incidentally, the motor M1 is arranged to be reversed on the basis of the signal M1R, causing the film to be rewound. The operations of Steps #22 and #23 need not necessarily be performed in series and may also be performed at the same time.

When the shutter charging and the film transportation have been completed, the process proceeds to Step #24, where it is determined whether the flash unit has been charged. If the flash unit is not completely charged, the process proceeds to Step #25, where charging of the flash unit is performed in preparation for the next photographic cycle.

The above-described embodiment has the following features. Since the engagement of the flash unit in the retracted position is released by utilizing a transmission system for driving an illumination-angle varying mechanism provided in the flash unit, there is no need for an electromagnet or the like which has conventionally been used for releasing such an engagement. Accordingly, it is possible to prevent an increase in the size of a camera and to achieve a reduction in cost.

Both the release of the engagement of the flash unit and the drive of the illumination-angle varying mechanism are performed by utilizing the rotation of a motor in one direction as one drive source. Therefore, that even after the release of the engagement, the operation of releasing the engagement is continued if the illumination-angle varying mechanism is being driven. However, such an operation is not a problem since a pushing member and a pushed member which is pushed during driving, are moved away from each other in an interlocked relation by movement of the flash unit toward the projected position after the release of the engagement.

Since the rotation of the motor in another direction can be utilized as a drive source for the elements other than the flash unit, it is not necessary to add another motor for the flash unit alone.

Although the above embodiment has been described with reference to the flash unit of the type which is built in a camera body, the present invention can also be applied to a flash unit of the type which is removably attachable to a camera body. In the case of the latter type of flash unit as well, even if the position of the flash unit varies between the pop-up position (projected position) and the down position (retracted position), the transmission system is not adversely affected since the axis of rotation of the flash unit is coincident with the central axis of a transmission gear.

Although the above-described embodiment employs gears for the transmission system, a belt drive mechanism may also be employed.

In the above-described embodiment, a turnable retaining lever and a retention releasing device are provided in the camera body, and a fixed engagement claw is provided in the flash unit. However, if the sides on which these members are provided are reversed, it is possible to achieve similar advantages.

According to the above-described embodiment, a camera includes a built-in flash unit, or a removably attachable flash unit which is turnable between a retracted position and a projected position with respect to a camera body and which is provided with an illumination-angle varying mechanism. The rotation of a motor in one direction is utilized as a drive source both to release the engagement of the flash unit in the retracted position and to drive the illumination-angle varying mechanism. Accordingly, there is provided a camera of reduced size and cost without the use of an electromagnet which has conventionally been employed.

According to the above-described embodiment, there is also provided a camera in which the force of a spring used in a flash-unit engagement mechanism is utilized to apply a braking force to the movement of the flash unit by a spring force from the retracted position to the projected position, thereby mitigating the impact caused by a pop-up operation.

According to the above-described embodiment, a camera includes a built-in flash unit, or a removably attachable flash unit having an illumination-angle varying mechanism in its interior. A motor for driving a camera-operating mechanism such as a mirror and a shutter is used within a camera body to drive the illumination-angle varying mechanism in the flash unit, and mechanisms to be driven are switched from one to another in accordance with the direction of rotation of the motor. Accordingly, it is possible to realize a reduction in the overall size of the camera and reductions in the size and weight of the flash unit, and it is also possible to provide a camera which can selectively perform the independent operation of the camera-operating mechanism or that of the illumination-angle varying mechanism.

What is claimed is:

1. A camera including a flash unit, said camera comprising:
    (a) an illumination-angle varying mechanism for varying a flash illumination angle by moving an optical element in a predetermined direction within said flash unit;
    (b) a motor, disposed in a camera body, rotatable in a first direction and in a second direction;
    (c) a clutch for switching a drive transmission in accordance with a switching of a direction of rotation of said motor;
    (d) a first transmission system for transmitting a rotation of said motor to said illumination-angle varying mechanism in accordance with a switching of said clutch caused by a rotation of said motor in the first direction; and
    (e) a second transmission system for transmitting a rotation of said motor to a camera-operating mechanism other than a flash unit operating mechanism in accordance with a switching of said clutch caused by a rotation of said motor in the second direction.

2. A camera according to claim 1, wherein said illumination-angle varying mechanism is capable of both increasing and decreasing the flash illumination angle by means of the rotation of said motor in the first direction.

3. A camera according to claim 1, wherein the flash unit is rotatably supported substantially at a middle position of a top cover of the camera body.

4. A camera according to claim 3, wherein said motor is disposed in a vicinity of a swingable mirror.

5. A camera according to claim 1, wherein said clutch comprises a planetary clutch.

6. A camera according to claim 1, wherein said camera-operating mechanism comprises a mirror-operating mechanism.

* * * * *

UNITED STATES PATENT AND TRADEMARK OFFICE
CERTIFICATE OF CORRECTION

PATENT NO. : 5,502,530
DATED : March 26, 1996
INVENTOR(S) : SHOJI KAIHARA, ET AL.

It is certified that error appears in the above-indentified patent and that said Letters Patent is hereby corrected as shown below:

Column 1

Line 14, "attachable," should read --attachable--.
   Line 42, "turnable" should read --turnable,--.

Column 8

Line 28, "forwarding accordance" should read --forward in accordance--.

Column 9

Line 32, "that" should be deleted.

Signed and Sealed this

Sixteenth Day of July, 1996

Attest:

BRUCE LEHMAN

Attesting Officer     Commissioner of Patents and Trademarks